(12) United States Patent
Gruber et al.

(10) Patent No.: US 6,890,474 B2
(45) Date of Patent: May 10, 2005

(54) ALGORITHM FOR ENHANCING THE LIFETIME OF CRITICAL COMPONENTS IN A LASER SYSTEM

(75) Inventors: Lukas Gruber, Mountain View, CA (US); Norman Hodgson, San Francisco, CA (US); Hanna J. Hoffman, Palo Alto, CA (US); Joerge Angstenberger, Abtsgemuend (DE)

(73) Assignee: Spectra Physics, Inc., Mountain View, CA (US)

( * ) Notice: Subject to any disclaimer, the term of this patent is extended or adjusted under 35 U.S.C. 154(b) by 278 days.

(21) Appl. No.: 10/142,273

(22) Filed: May 8, 2002

(65) Prior Publication Data

US 2002/0175149 A1 Nov. 28, 2002

Related U.S. Application Data

(60) Provisional application No. 60/289,643, filed on May 8, 2001.

(51) Int. Cl.[7] ................................................ B23K 26/06
(52) U.S. Cl. ................... 264/400; 219/121.75; 264/482; 359/813; 359/822
(58) Field of Search .............................. 264/1.37, 482, 264/400; 219/121.6, 121.68, 121.75, 121.7; 359/813, 822

(56) References Cited

U.S. PATENT DOCUMENTS 5,179,562 A  1/1993 Marason et al. ............... 372/22
5,280,491 A * 1/1994 Lai ............................... 372/24
5,825,562 A  10/1998 Lai et al. ...................... 359/822
6,019,589 A * 2/2000 Hasegawa et al. .......... 425/174.4

FOREIGN PATENT DOCUMENTS

EP       1 072 939 A2    1/2001
WO     WO 00/77890     12/2000

* cited by examiner

Primary Examiner—Mathieu D. Vargot
(74) Attorney, Agent, or Firm—Paul Davis; Heller Ehrman

(57) ABSTRACT

A method and system are described aimed at substantially increasing the lifetime of sensitive optical elements subjected to high power laser radiation. The lifetime enhancement is accomplished by spatially distributing the laser beam spots both globally and locally according to algorithms that are custom tailored to the subject element as well as the system and application needs. The methods of the invention are particularly well-suited to non-linear crystals used to convert radiation from high repetition rate, diode-pumped laser systems into the UV spectral range, where lifetime requirements are particularly challenging. The methods of the invention further enable effective utilization of available experimental data characterizing the element's performance in combination with a stored library of preferred spot scanning patterns that may be executed on the surface of the element according to the selected algorithm.

19 Claims, 9 Drawing Sheets

No μSpot Move (a)

Fast μSpot Move (b)

Slow μSpot Move (c)

ALGORITHM FOR ENHANCING THE LIFETIME OF CRITICAL COMPONENTS IN A LASER SYSTEM

CROSS-REFERENCE TO RELATED APPLICATION

This application claims the benefit of U.S. Ser. No. 60/289,643, filed May 8, 2001, which application is fully incorporated herein.

BACKGROUND OF THE INVENTION

1. Field of the Invention

This invention relates generally to systems, and their methods of use, that distribute laser pulses over surfaces of optical elements, and more particularly to systems, and their methods of use that distribute laser pulses over surfaces of optical elements to substantially enhancing lifetimes available from the optical elements.

2. Description of the Related Art

Solid state lasers high brightness beams are known to be an excellent tool for precision processing of materials and are increasingly in demand for a host of applications ranging from microlithography to marking and via drilling. For many semiconductor microprocessing applications, diode pumped solid state lasers, and their harmonics, offer a technology of choice because of their superior reliability, low operating costs and excellent output characteristics. In particular, a combination of high peak power, excellent mode quality and high long-term pointing stability enabled the development of reliable, frequency tripled and quadrupled high repetition rate lasers with ever increasing UV outputs near 355 nm and 266 nm, respectively.

Alternative solid state gain media, such as $Nd:YVO_4$, Nd:YAG and Nd:YLF, have been utilized to generate high power UV outputs using frequency multiplexing with various nonlinear crystals. Among these, $Nd:YVO_4$ has become a gain material of choice for applications requiring operation at very high repetition rates ranging, typically, from 10 to over 100 kHz. Frequency tripled lasers based on this medium are now commercially available with UV output powers of over 4 W at 355 nm. Fourth harmonic power levels exceeding 2 W at 266 nm have also been demonstrated in practical systems and interest has been growing in lasers with still shorter wavelengths such as the frequency-quintupled radiation near 213 nm and even shorter. UV lasers based on other gain materials, such as Nd:YAG, have been successfully power scaled as well, generally for applications requiring lower repetition rates but higher energies and/or longer pulse durations.

The increasing emphasis on power scaling at shorter wavelengths and higher repetition rates place difficult requirements on the laser components. A major practical limitation to continued scaling of power is the deterioration in lifetime of key optical elements, both linear and nonlinear. In particular, laser induced damage is known to compromise long term operation of protective coatings, substrates and the nonlinear materials employed in frequency conversion processes when subjected to high peak and average power laser beams. The literature recounts various mechanisms that can lead to such damage, including thermal, photoacoustic and plasma effects. The damage is known to accelerate the higher the power density and the shorter the wavelengths, and is further facilitated by the presence of defects on optical elements, which can form absorbing centers.

To date, development of damage resistant high quality coatings suitable for high power operation in the UV lags well behind coatings available at visible wavelengths. As repetition rate is increased, single pulse damage is further aggravated by the potential for cumulative damage mechanisms. Thus, allowing a high power beam to pass through a single spot in a coated optical element or a nonlinear crystal for long periods of time is known to result in performance degradation, sometimes at power levels well below single pulse damage thresholds. Mechanisms suggested for such cumulative damage include formation of UV absorbing color centers and structural changes of the polished entrance/exit faces of the coated element. Generally, such degradations become more severe the higher are the incident beam power densities and repetition rates and the shorter are the input and/or output wavelengths.

Nonlinear crystals employed in frequency converted high repetition rate laser system are especially susceptible to such cumulative damage, as manifested by the early onset of degradation in the harmonic conversion efficiency. Furthermore, in homogeneities present in any birefringment crystal can result in widely varying conversion efficiencies in different parts of the same crystal, a problem that is exacerbated when high intensity focused beams and temperature tuning are used to optimize the harmonic generation process. Nonuniformities in temperature throughout the crystal volume caused by varying distance from the thermal source or sink, contaminants, varying degrees of surface polish, and bulk irregularities can all compromise the crystal performance over time. Even before the onset of actual damage, thermal effects caused by residual UV absorption can lead to thermal dephasing which reduces the effective interaction length in the crystal and lowers the efficiency for frequency conversion.

Temperature and angle tuned non-linear borate crystals, such as LBO and BBO and the newly developed CLBO that are routinely used to produce frequency conversion at the third and fourth harmonics, are known to be subject to such thermal dephasing at high average powers. As repetition rates and pulse energies are increased, thermal dephasing can become an issue even for a material such as CLBO which has a large thermal acceptance bandwidth. Although this effect may be temporary and can further be alleviated using active temperature controls, the implementation of such techniques becomes more complex and costly as powers are increased beyond certain levels.

In particular, because of the generally low thermal conductivity of an isotropic crystals, the time constant for crystal temperature adjustment is too large to rely on temperature adjustment as the sole means for maintaining constant levels of UV output at elevated power levels. Similarly, though some of the observed damage mechanisms in crystals and other optical elements may be annealed over time, strong thermal effects due to increasingly high absorption will eventually result in permanent damage, requiring replacement of the element.

As is the case for other coated optical elements, the damage to nonlinear optical elements is more pronounced, and threshold for damage lower, as the output wavelengths become shorter. This has been a major limiting factor on achieving efficient conversion to higher order harmonics at scaled power levels.

In recent years, considerable efforts were carried out to mitigate against laser induced damage including improvements in the quality of optical substrates, surfaces and coatings, as well as the development of new, more tolerant laser and nonlinear conversion designs. One particular approach commonly employed in commercial systems containing harmonic modules is to translate the nonlinear crystal through the beam during operation so that the incident beam continually encounters a fresh crystal volume before any crystal degradation can occur.

For example, U.S. Pat. No. 5,179,562 to Marason et al teaches a system and means for crystal translation applied to the case of intracavity conversion of CW beams. This patent further describes method for active adjustment of the intracavity intensity and temperature profiles of the crystal to maintain optimal conversion efficiency levels. In another example, more specifically adapted to pulsed operation of solid state UV lasers, U.S. Pat. No. 5,825,562 to Lai et al., discloses a system providing continuous motion for minimizing laser exposure time for any one spot and prolonging the usable life of an optical element subjected to high intensity irradiation. The preferred embodiment of the system of Lai et al., includes a pair of slides driven by a single motor, with a nonlinear crystal mounted to one of the slides. Keeping each slide fixed in one orthogonal direction allows the motion to be carried out, preferably in a circular or spiral pattern, while maintaining crystal axis orientation. This preserves the phase matching conditions necessary for optimal harmonic conversion.

Although the system of Lai et al., represents an improvement over other approaches involving manual and/or one-dimensional scanning or crystal translation techniques, it still suffers from certain shortcomings. In particular, while the heat load is effectively distributed over a larger interaction volume, namely the entire crystal surface, the techniques disclosed ignore the possibility that merely providing for continual repositioning of laser pulses over the crystal or optical element surface may not be sufficient to alleviate thermal damage concerns especially when repetition rates and power levels are increased to the multiple Watt levels currently of interest. For example, pulses may be inadvertently placed in an overly close temporal and spatial proximity do not take into account the potentially deleterious consequences of too much overlap between laser spots. Furthermore, variations in surface quality due to residual defects and inhomogeneities can result in non-uniform, unstable outputs. This may be completely unacceptable to semiconductor processing applications which require highly stable and uniform UV powers to guarantee repeatable effects in the processed materials.

There is a need for solid state laser systems, and their methods of use, that provide for prolonged life of optical elements exposed to high power laser radiation. There is a further need for solid state UV laser systems, and their methods of use, that provide for prolonged life of optical elements exposed to high power UV radiation, while maintaining output beam stability over long periods of time. There is yet another need for solid state, high repetition rate UV laser systems, and their methods of use, that provide for prolonged life of optical elements as average power levels increase, especially in high repetition rate solid state UV laser systems employing high intensity beams in various parts of the system.

SUMMARY OF THE INVENTION

Accordingly, an object of the present invention is to provide a high power laser system, and its method of use, that has improved efficiency, stability and lifetime.

Another object of the present invention is to provide a high power UV laser system, and its method of use, that provides for prolonged life of optical elements exposed to high power UV radiation.

Yet another object of the present invention is to provide a high power UV laser system, and its method of use, that enhances the lifetime of optical elements exposed to high power UV radiation, while maintaining output beam stability over long periods of time.

A further another object of the present invention is to provide a high power UV laser system, and its method of use, that provides for prolonged life of optical elements exposed to high power UV radiation as average power levels increase Another object of the present invention is to provide a high power laser system, and its method of use, that provides for prolonged life of optical elements exposed to high power radiation by controlled distribution of laser pulses over the surface of sensitive, lifetime-limited optical elements.

Yet another object of the present invention is to provide a high power laser system, and its method of use, that provides for prolonged life of optical elements exposed to high power LW radiation with computer controlled translation stages or scanning elements that execute pulse placement patterns on the optical elements according to pre-selected algorithms.

A further object of the present invention is to provide a high power laser system, and its method of use, that provides for prolonged life of optical elements exposed to high power LW radiation by determining UV output powers and executing intra-operational pulse placement pattern adjustments when the power decrease below a certain pre-set value.

Still another object of the present invention is to provide a high power laser system, and its method of use, that provides for prolonged life of optical elements exposed to high power UV that has automatic control of relative motion between an incident high power laser beam and optical elements.

Another object of the present invention is to provide a high power UV laser system, and its method of use, that provides for prolonged life of optical elements exposed to high power UV radiation and minimizes temporary and permanent power degradations or undesirable fluctuations associated with high repetition rate systems

DETAILED DESCRIPTION OF THE PREFERRED EMBODIMENT

Figure 1:
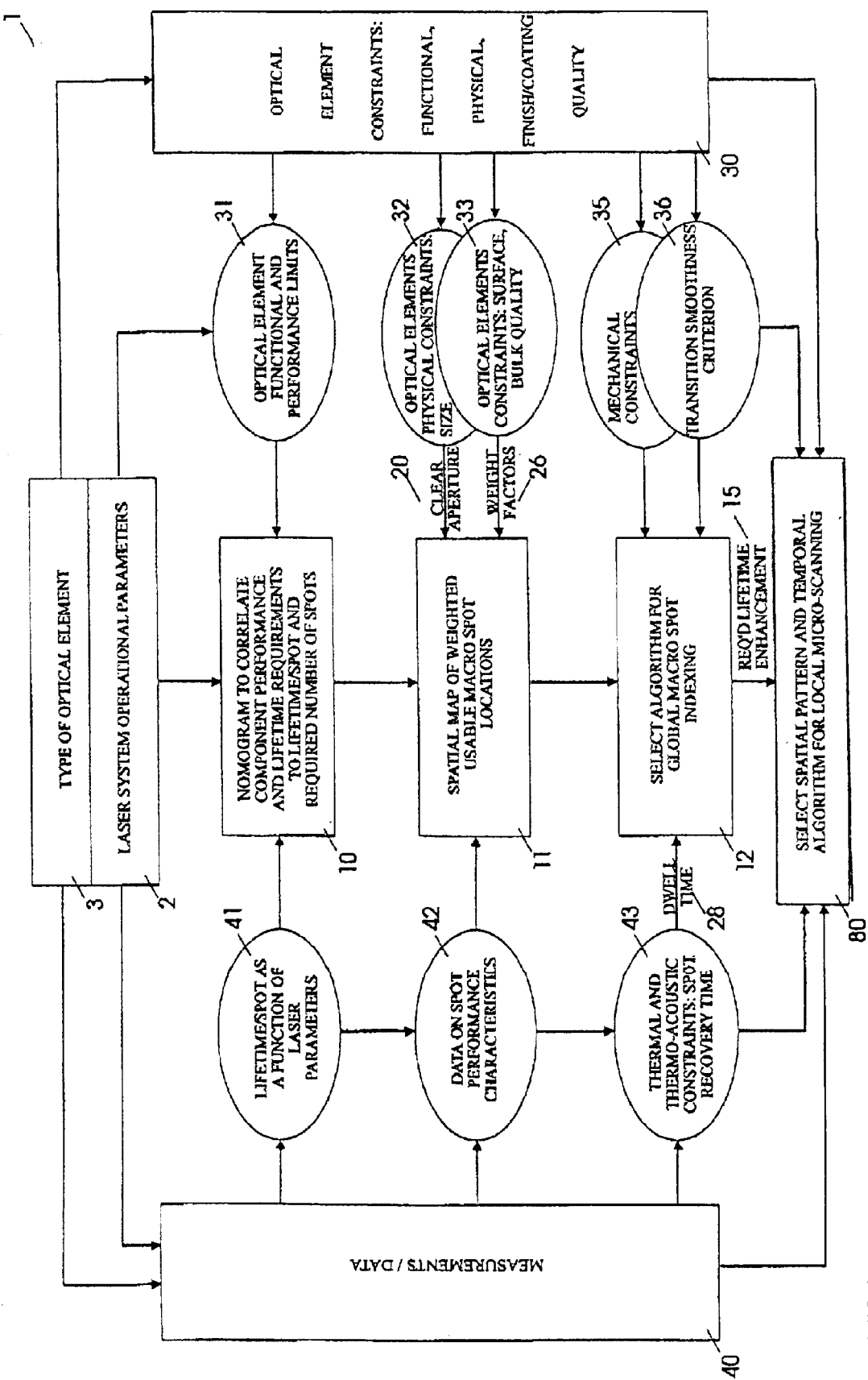
FIG. 1 is a flow-chart diagram indicating the steps involved in building up an algorithm for enhancing the lifetime of a sensitive optical element.

In various embodiments, the present invention provides an algorithm to control operation of optical elements exposed to high power laser radiation within solid state laser systems, to thereby extend the useful life of these optical elements. In one embodiment, the solid state laser system has a repetition rate higher than about 5 kHZ and contains one or more optical elements that are susceptible to damage when exposed to high power laser beams over an extended period of time. In other embodiments, the repetition rate may be lower but the energy per pulse is higher, resulting in high average power system. It is further particularly desirable to apply the systems and methods of the present invention to solid state laser systems containing one or more UV beams, which are known to compromise survivability of coatings applied to surfaces of optical elements utilized within the laser system. It is a key aspect of the present invention to enhance the lifetime of damage prone optical elements through judicious application of algorithms custom tailored to specific laser system and application requirement. The algorithm allows automatic control of translation of the optical element with respect to the laser beam thereby alleviating power degradations due to deterioration of any one spot on a given element's surface. The algorithm includes provisions that allow said translations to be carried out while maintaining output beam stability and/or beam quality over long periods of time which can be, by way of example and without limitation, in excess of 300–500 hours. These provisions may include necessary adjustments required to maintain the functional integrity of the element with respect to overall performance. Control of these adjustments as well software commands essential to the execution of the algorithm are preferably contained within a central microprocessor unit integral to the laser system. The processor unit may further include a library of translation patterns allowing user controlled selection. These patterns order the relative displacement of the laser beam optical element and provide a desired spatial and temporal distribution of spots over the surface of the element. Mechanisms for relative translation include mechanical means for physically transporting the element relative to a fixed laser beam or scanning means that deflect a laser beam over a fixed optical element. Any number of mechanical or optical scanning devices known in the art may be used as part of the system and methods of the invention.

The component in question may be a coated optical element and/or one or more of several nonlinear crystals used to convert the fundamental frequency of the radiation from a high power laser to its harmonic. Of particular interest are nonlinear crystals such as LBO and CLBO, customarily used to convert radiation into the UV spectral range. Other existing as well as newly developed crystals can also be protected by the systems and methods of the present invention which may, in alternative embodiments, be applied to various spectral ranges including the UV and mid-infrared spectral ranges. Examples of other damage sensitive crystals that may benefit from application of the general algorithms disclosed are other borates such as CBO, sulfates, KTP, $LiNbO_3$ and similar crystals used in frequency conversion devices. Also known in the art are periodically poled materials such as PPLN which may be particular beneficiaries of methods and systems of the invention because of their enhanced sensitivity to input beam parameters. In various embodiments, input data is utilized relative to prolonging the life of the selected optical component. Input data can include the expected lifetime per given spot size as determined from measurements and projections based on a given set of operational laser parameters.

Referring now to the drawings and more particularly to FIG. 1, a diagrammatic flow-chart is shown of a generalized algorithm 1 designed to distribute laser pulses over the surface of an optical element for the purpose of substantially enhancing lifetimes available from said component. Given a particular optical element 3, the starting point for the algorithm is a top-level set 2 of laser system operational parameters that apply to operation of the element in the system. Key inputs to the development of the final algorithm are provided by known element constraints 30 and different sets of measurements performed on the optical element, shown collectively as 40. The constraints on the element 3 include functional, physical and various surface finish and/or coating quality parameters. By way of illustration, and without limitation, in the case of a nonlinear crystal the functional limits 31 on the nonlinear crystal can include angle and temperature phase matching requirements, as well as the magnitude of the nonlinearity for a given set of input and output wavelengths. Physical limits include at least available clear aperture in the preferred orientation and surface quality factors include absorption coefficients, reflectivity, surface flatness, surface quality issues such as striations and inclusions and coating quality and adhesion. The measurements 40, include at least spot lifetime measurements 41, data 42 on different spots performance characteristics across the element's area and observed thermal and/or thermo-acoustic limits 43 which set the recovery time per spot. The laser parameters 2, may include at least a range of power, energy, repetition rate, input and output wavelengths, pulse durations and beam divergence over which the optical element is expected to maintain its specified performance. For example, to obtain high conversion efficiency from a nonlinear element used for frequency conversion, it is well known that the laser beam incident on the element has an area on the element that may need to be limited to within a relatively narrow range, because of trade-offs between maximizing conversion efficiency by decreasing the beam area (and thereby increasing the power density) and staying well below the damage threshold, which sets a lower limit on the allowed beam area. These constraints are generally known for a given crystal but may vary greatly, depending on the wavelength range where the crystal must be operated and the power levels.

Figure 2:
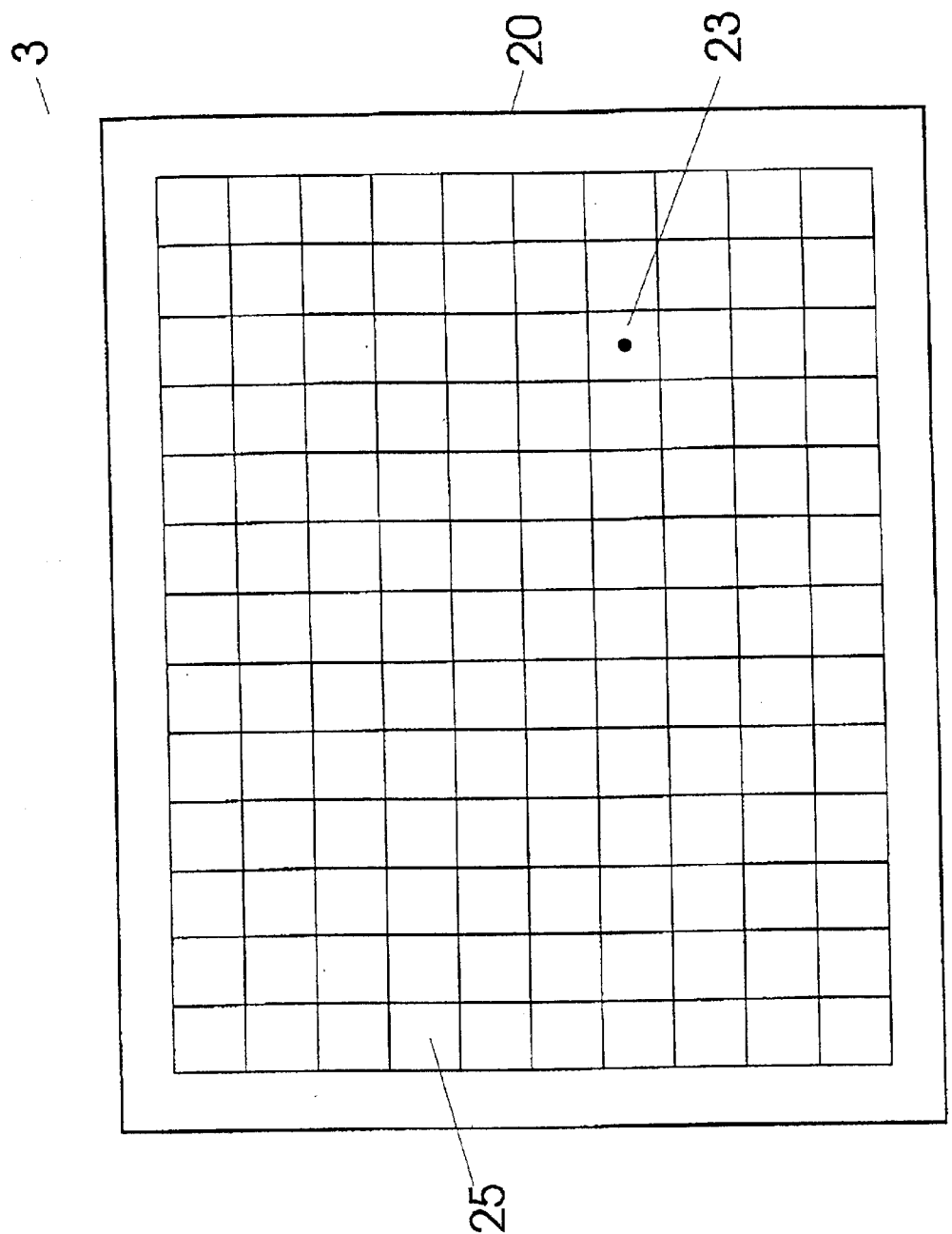
FIG. 2 shows a schematic of an optical element's surface divided into macro-spots FIG. 3 indicates one embodiment of an inside-to-outside spiral translation pattern between consecutive macro-spots

Next, the available area of optical element 2, defined as clear aperture 20 is divided into a grid consisting of a selected number of macro-spots 25, as is shown in FIG. 2. Physical limits such as available crystal size, surface finish and coating quality restrictions then serve to define the clear aperture 20. Generally, the beam area 23 on the element's surface (also referred to sometimes as the beam spot size) is considerably smaller than the size of the macro-spots. The lifetime enhancement feature that is key to the present invention takes advantage of this size difference by setting up an local micro-scanning algorithm within each macro-spot 25 that is embedded within a global macro-spot algorithm controlling translation of the beam between successive macro-spots, as described further below. Exemplifying the relative magnitudes of the spot sizes as alluded to above, one particular embodiment, using an LBO crystal is used to convert the radiation of a pulsed 1.064 μm beam into 355 nm may be used. Typically, the beam diameter of the generated UV beam is about 75 μm, whereas the macro-spot size is about 200–400 μm on each side. Measurements indicated that areas outside of this beam diameter were not deteriorated after a substantial irradiation time. It should therefore be possible to increase the lifetime of one macro spot substantially (about one order of magnitude) if the whole area within one macro spot can be used, using appropriately constructed micro-scanning algorithm.

Returning to FIG. 1, the starting point for the algorithms that comprise the system and methods of the invention is a set of critical requirements imposed on the optical element as set by the overall laser and optical system design on the one hand, and the user or application needs on the other hand. These requirements include an all-important lifetime requirement for a particular operational range. Given a-priori knowledge of the functional limits of the optical element 3, a nomogram 10 is developed correlating the desired lifetime of the system incorporating the element to the number of required macro-spots 25 and the per-spot lifetime. Individual spot lifetime measurements 41 may provide further input to the nomogram 10 by setting time constants for translation of the beam from one macro-spot to another, a process referred to herein as "indexing".

Known optical element physical constraints 32 and performance constraints 33 may be combined with data 42, from experimental measurements to characterize individual macro-spot performance across the clear aperture 20 to assign weight factors 26 to each macro-spot 25. These weight factors reflect the fact that the macro-spots are not all equally useable, due, for example, to edge effects that may cause beam distortions or the presence of small defects which may engender damage processes upon prolonged exposure to laser beams. Thus, some macro-spots may be entirely eliminated whereas others used only as a last resort near the end-of-life. The result is a matrix of weighted macro-spots corresponding to a spatially distributed map 11 of ordered spots across the clear aperture of the element. The list of weighted spots may then be stored in a central processor and retrieved, if needed, as input to a global algorithm 12, wherein the macro-spots are indexed to each other according to a selected pattern. As referred to herein, the global spot indexing map represents a selected sequence of translations within the matrix of macro-spots 25 so that the next spot on the sequence is exposed to incident light once a given spot fails to provide the requisite performance.

The indexing of macro-spots may be further modified due to jitter considerations and mechanical constraints 35 which are inherent to the means used to affect relative translation between the optical element and the beam. To minimize jitter in moving from one macro-spot to another, a transition smoothness criterion 36 may be imposed on the global translation pattern. Additional inputs such as spot recovery time determined from actual measurements 43 may also restrict the temporal sequencing of the translations among macro-spot. Such temporal aspects are therefore considered to be an inherent part of the global algorithm 12.

Figure 3:
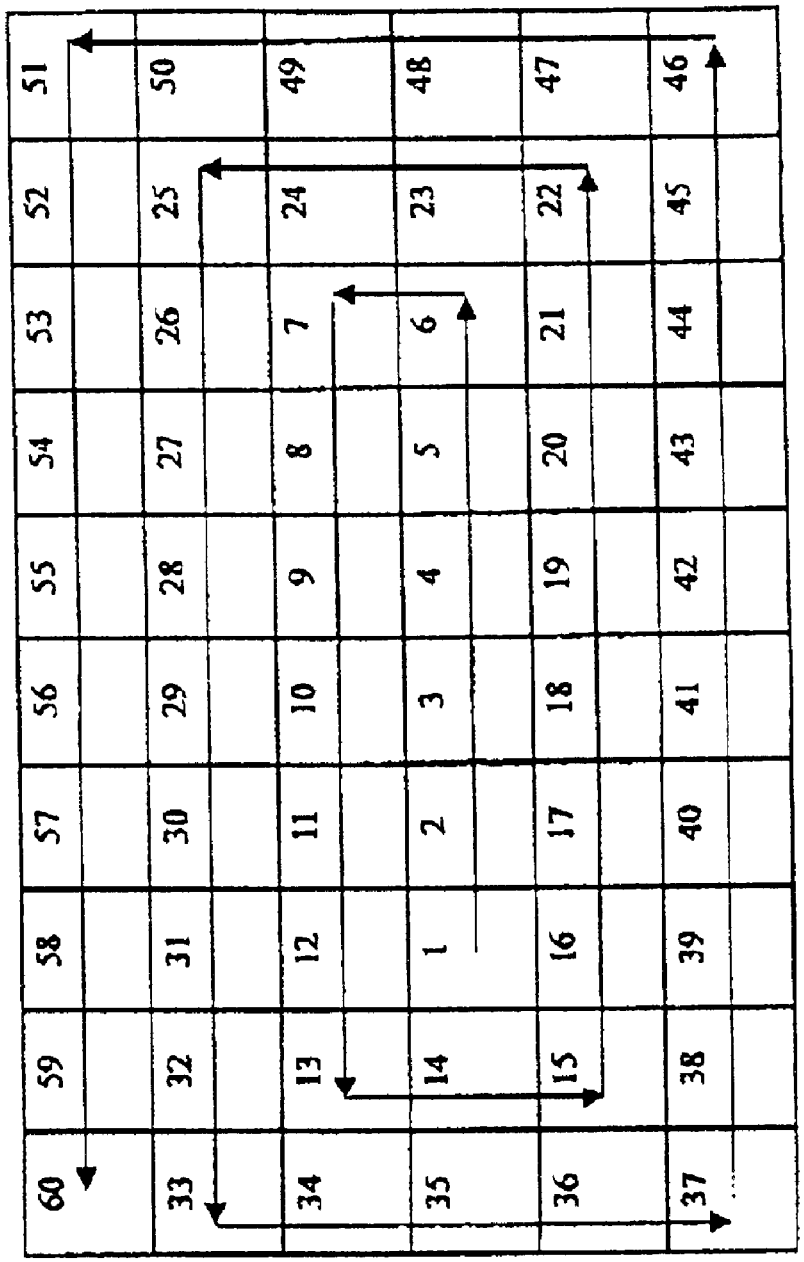

By way of illustration, and without limitation, FIG. 3 shows an example of a spiral-shaped spatial global indexing pattern wherein the spot-to-spot movement is performed in a spiral pattern 90 starting at the center of the crystal and moving towards the edges, until all the 60 spots indicated are used up. This pattern was found to be useful for a case when the optical element is, for example, a nonlinear crystal such as LBO, phase-matched and tuned for harmonic conversion into 355 nm. The spiral pattern illustrated in FIG. 3 ensures that the crystal is used as long as possible in its central area, which is preferred because the outer edges of optical crystals are known to be generally more susceptible to imperfections and may not perform as well as the center. As mentioned above, temporal considerations such as spot recovery time may be used to set initially the maximum dwell time per macro-spot. However, as will be described below, in-line monitors that detect any sudden power degradations may be incorporated as an added safety feature to allow immediate translation to the next spot on the list if the lifetime appears to have been unexpectedly compromised.

Although implementation of a global algorithm to affect relative translation of a laser beam among macro-spots on the surface of a sensitive optical element may be useful in extending the lifetime of the element, this procedure in and of itself may not be sufficient to meet the overall lifetime requirements of many laser systems. This is especially true for systems where the number of available spots multiplied by the maximum life-time per macro-spot falls considerably short of the overall system lifetime requirement. Furthermore, increasing the number of macro-spots may not always be possible or desirable. In one specific embodiment, by way of illustration and without limitation, using LBO as the tripler crystal for Third Harmonic Generation (THG) of the 355 nm output from a high repetition rate diode pumped Nd:YVO$_4$ laser, a single spot is defined as an area of 300×300 □m on the crystal. Because the output UV beam is typically only about 100 □m in diameter, only part of the available macro-spot area is used by the UV beam. If the damage scales with available macro-spot area, the lifetime of the THG crystal can be increased, in principle, by nearly an order of magnitude, just by taking advantage of the full available spot area. By moving at a fixed rate to slightly different locations, all contained within the same spot, single spot lifetimes of 600–1000 hours can be achieved. This compares with the 30–100 hrs per-spot lifetime demonstrated for a standard 355 nm conversion module for power level of 8–10 W, which falls short of the >300 hrs required by many industrial applications, assuming crystals divided into about 50–60 macro-spots.

The feature of intra-spot localized spot scanning (referred to as "smearing" or "microscanning") comprises a key aspect of the present invention. Contrary to prior art which addressed only select spatial distributions of the incident beam across the entire crystal aperture, generally without regard to subtle temporal sequencing requirements or localized damage spots, this invention provides for irradiation of an optical element in a well-ordered, non-random fashion, both spatially and temporally. This results in better distribution of any unwelcome temperature gradients to the entire surface while minimizing the build-up of heat and thermal effects in any localized area. As was shown in the flow-chart diagram of FIG. 1, if lifetime enhancement factor 15 is necessary following implementation of a global spot indexing algorithm, a algorithm 80 for local micro-spot scanning is derived for the element. The local algorithm consists of a selected spatial pattern and temporal sequencing as determined by measurements 43 of spot recovery time and taking into account any transition smoothness criteria 36 imposed by mechanical system constraints 35, which may further limit the types of patterns that may be selected. For example, when the optical element is a non-linear crystal used for frequency conversion, which may be harmonic or parametric, smoothness of transitions within a given pattern are especially critical to maintaining optimal phase matching conditions, and this may impose certain mechanical tolerances on the system used to drive the relative translation between the beam and the crystal.

Figure 4:
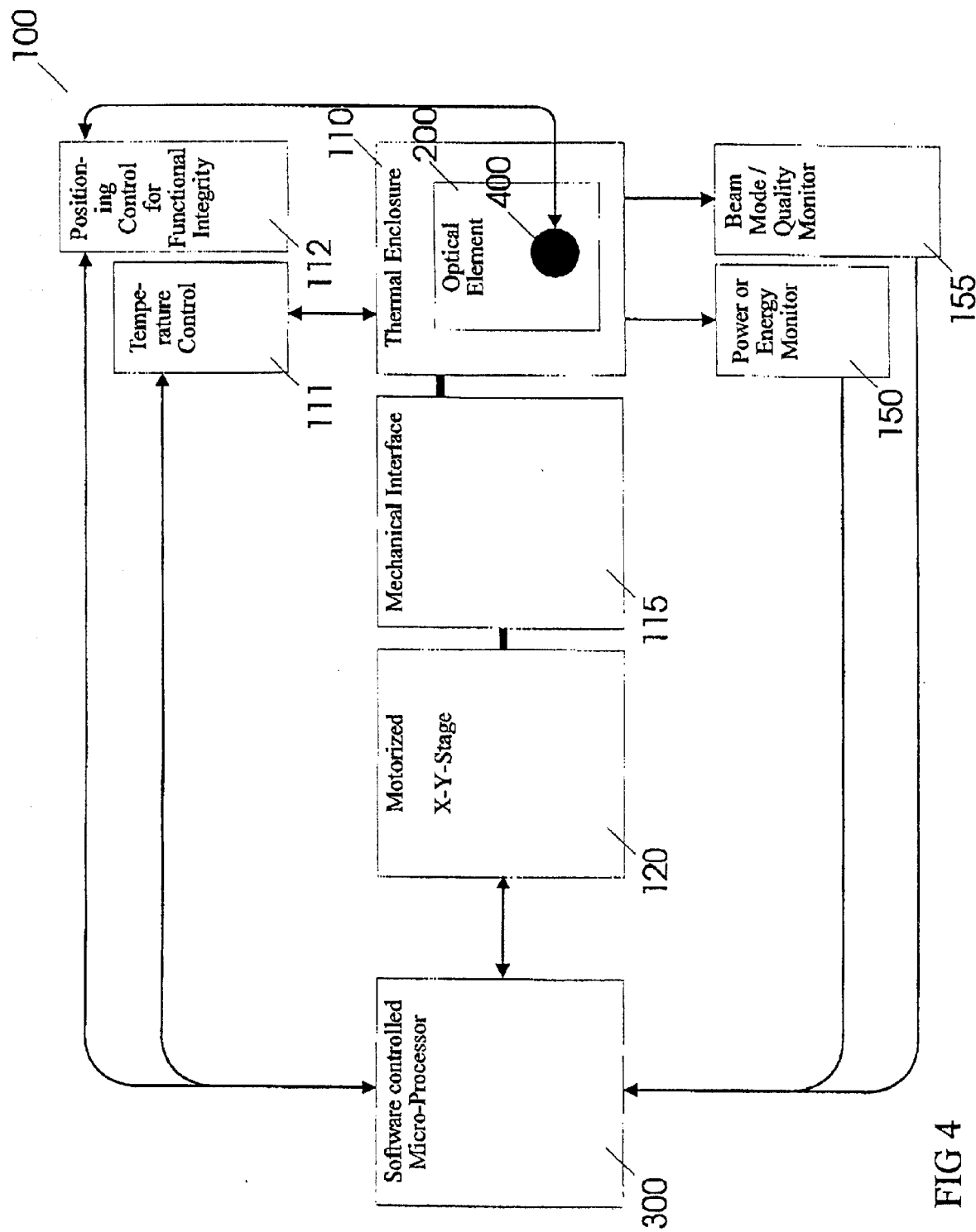
FIG. 4 is a top-level schematic of a generic system incorporating a translation stage, a fixed beam and an algorithm for increasing the lifetime of an optical element

FIG. 4 shows a diagram of a system that may be used to implement the algorithms of the present invention. In this preferred embodiment, an motorized moving X-Y translation stage can be utilized to translate optical element 200 with respect to laser beam 400. The stage may be connected through a mechanical interface 115 to a thermal enclosure 110 containing the element. The temperature within the enclosure is controlled by controller 112. In addition the laser beam may be subject to positioning control in order to maintain functional integrity of the element. By way of illustration, if the element comprises a nonlinear crystal, the positioning controller 112 will be able to maintain angular orientation, while temperature controller 112 will adjust the crystal temperature as required to maintain phase-match conditions at an optimum even as the crystal is translated through the beam. Power or energy monitors 150 as well as beam quality or beam mode monitors are optionally included as part of the system as an additional safety feature. Any unexpected power drop or mode degradation will therefore be immediately detected and instructions may be automatically issued to translate the crystal to another macro-spot.

In one embodiment of the present invention, the manner in which transition among consecutively numbered spots on the list is translated to a physical pattern on the element are determined by internal commands issued by the operating software module 300 of the automated module containing the element. The local micro-scanning pattern is generally not under the control of the user. During the software design phase one or more patterns can be selected and stored within the central micro-processor, subject to the condition that the operation of the system be substantially equivalent between alternate patterns. On the other hand, the global translation among macro-spots may be automatic, or it may be transparent to the user and under their control. For example, as an added safety feature, the user may be able to directly issue a command to move to the next macro-spot on the list if an unexpected degradation in power or output beam quality to below a pre-specified level has been detected, sooner than the pre-selected time initially programmed into the micro-processor. Alternatively, input from internal monitors 150 and/or 155 may be used to automatically affect movement of the translation stage from one spot to the next in the pre-programmed list or pattern.

Figure 5:
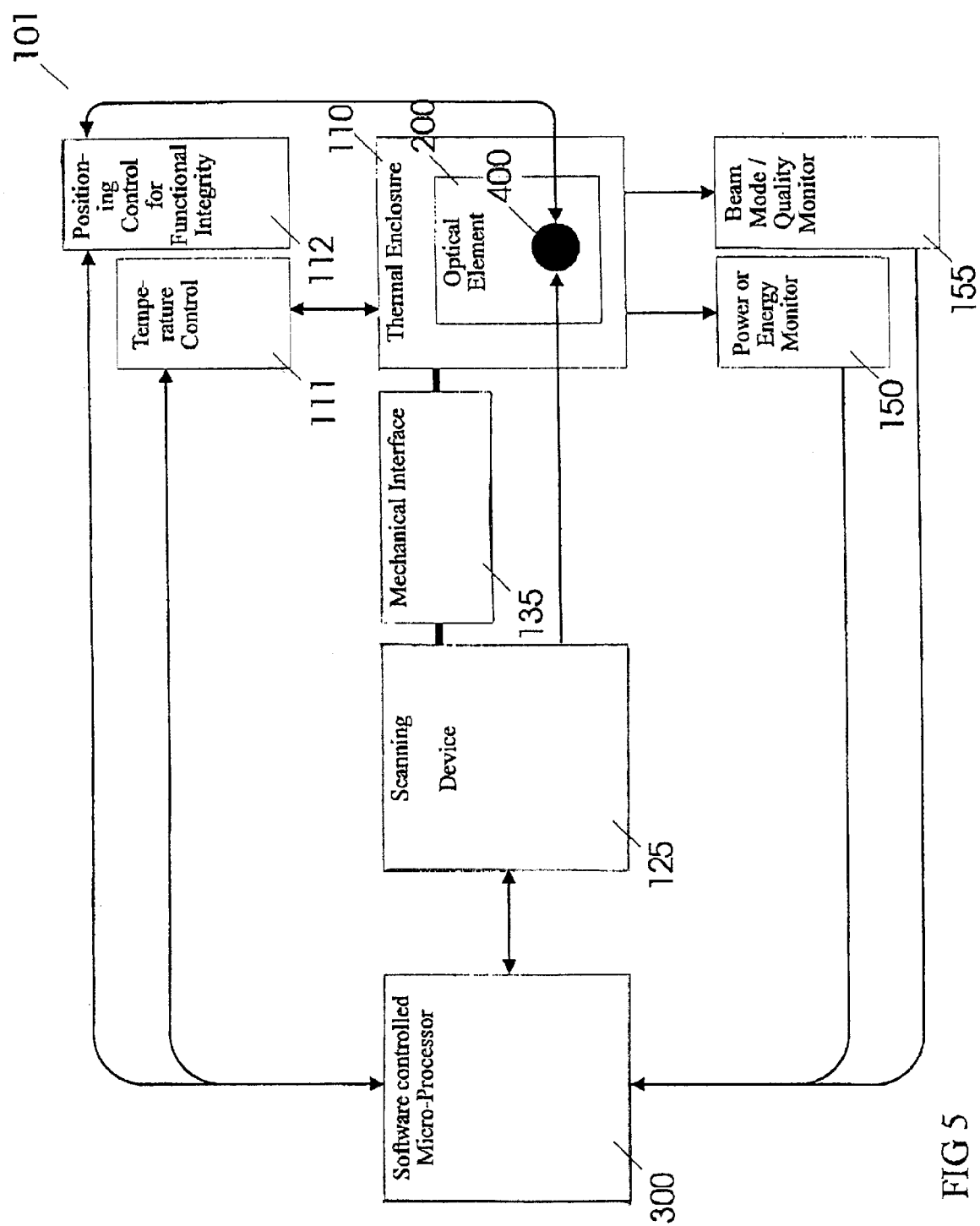
FIG. 5 shows a schematic of an alternative embodiment for affecting relative translation between a beam and a stationary optical element using a beam scanning device

As an alternative embodiment to the translation stages, a system comprising beam scanning or deflection device is shown in FIG. 5. The scanning device 125 may comprise any number of beam deflecting systems known in the art of beam scanning, such as piezo-electrically controlled mirrors or acousto-optic beam deflectors. Beam scanning techniques and devices may be especially useful to control beam motion on the surface of passive optical elements such as coated mirrors and prisms.

Figure 6:
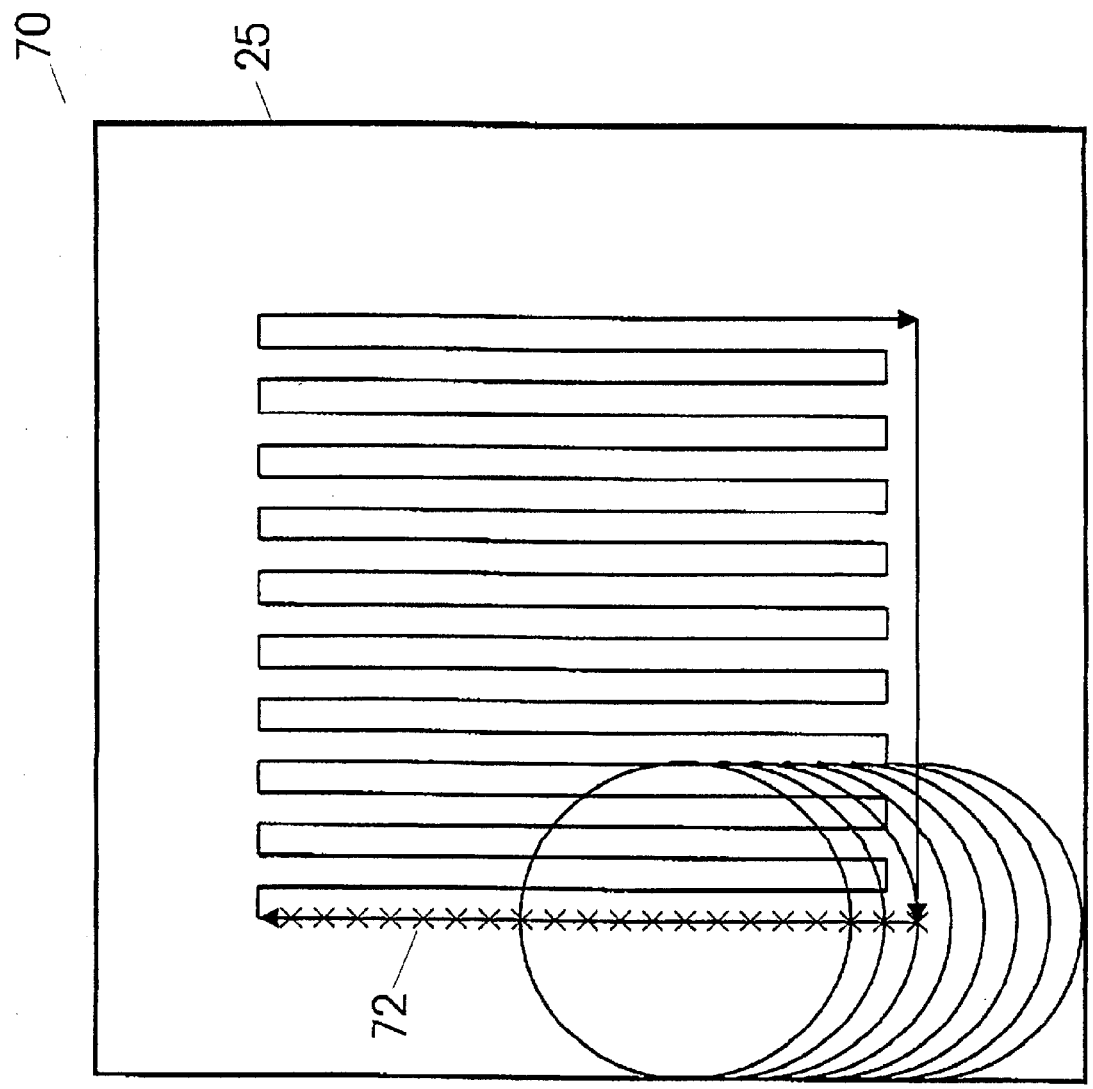
FIG. 6 is a schematic of a micro-scanning pattern within a single macro-spot

The concept of localized beam smearing has been implemented in a prototype automated tripler module aiming to produce power outputs in excess of 6 W at 355 nm. FIG. 6 shows one example of a pattern selected for the intra-spot scanning. The pattern can be driven using relatively simple software commands and is consistent with readily available, relatively inexpensive mechanical designs and parts. Additional software commands may be incorporated to perform a variety of selected measurements before, during or after the micro-scanning process and to make any adjustments in the selected pattern. Example of useful measurements include output power, beam quality, beam position, pointing jitter and pulse duration.

Automated moving stages have been successfully utilized with the methods and systems of the present invention, including but not limited to the use of translation stages driven by a stepper motor to translate the a crystal, such as an LBO crystal, using software commands according to the comb-like pattern indicated in FIG. 6. Additional software commands were used to align the stages to conform with requisite phase matching requirements. Typical resolution of the stepper motor was about 40 steps/micron. A standard tripler module HM 355 made by Spectra-Physics can be utilized to accommodate these stages. With a default step size for a micro-step set at 10 micron and a default time constant of 10 s for every micro-move, the pattern of FIG. 6 was rastered in about 4000 s, upon which the pattern could be started again from the same initial point. With these conditions lifetimes in excess of 500 hrs per single spot were already demonstrated, thereby confirming feasibility of our concept. Changing the default values is straightforward and may be used to further optimize the operation, and to match a given set of specific operating conditions.

Figure 7:
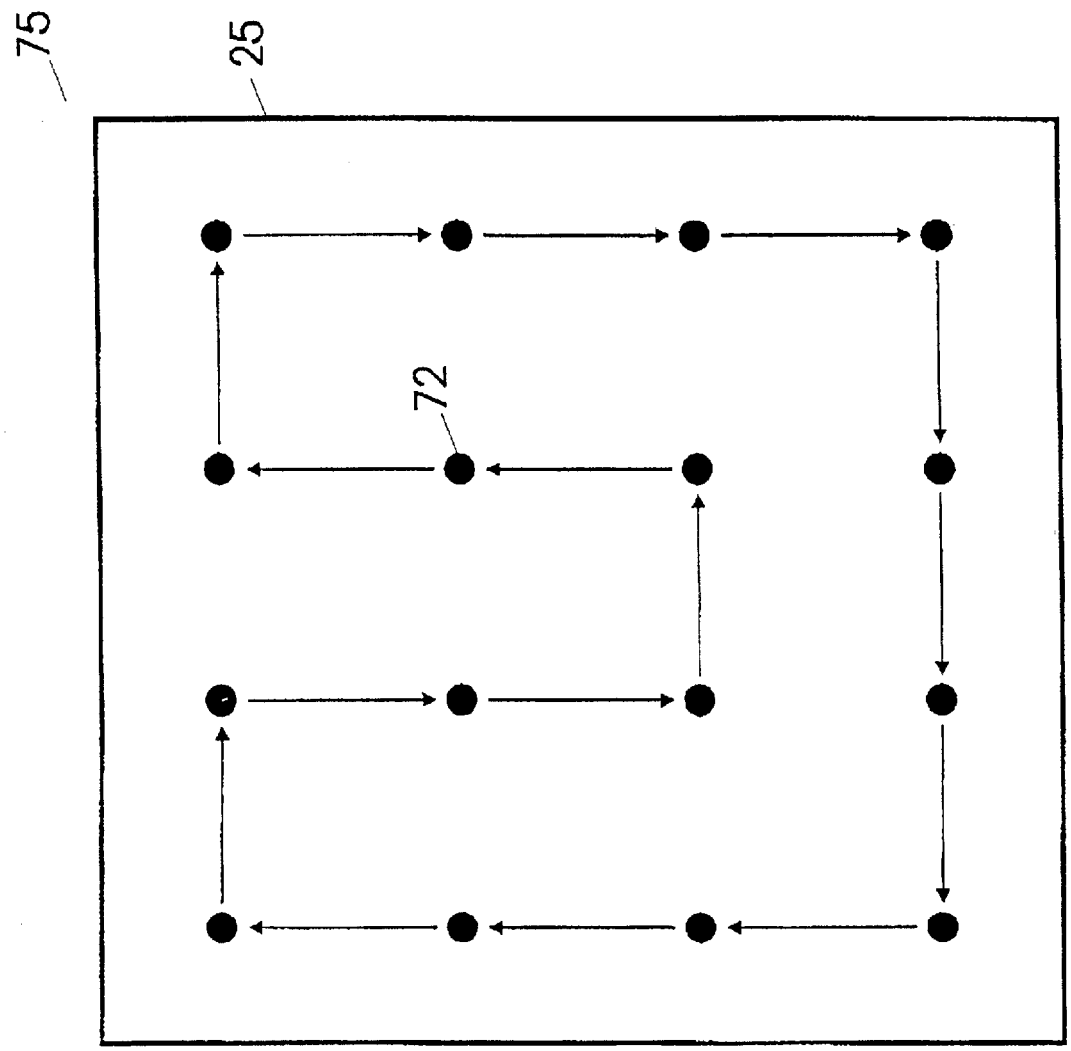
FIG. 7 is a schematic of an alternative micro-scanning pattern within a single macro-spot

In another example used with the same harmonic conversion module, the 300 μm×300 μm macro spot 25 on the LBO crystal is subdivided into a matrix of 4×4 non-overlapping micro spots, as shown by pattern 75 in FIG. 7. Numeral 72, again indicates the center of the beam area. The dwell time per micro-spot is selected to be about 20 hours, after which time the micro spot is considered used. In this example, the dwell time is preset at a relatively low level for safety reasons even though some micro spots might last much longer. By moving to the next micro spot a new and uncontaminated/undamaged surface area is accessed and the module containing the LBO crystal shows uncompromised performance for an additional 20 hours. For the 16 micro-spots shown in FIG. 7, the lifetime for each macro-spot 25 is increased to about 320 hrs, with excellent safety margin. With the spiral indexing pattern for the 60 macro-spots shown in FIG. 3, the overall expected lifetime of the LBO crystal using the methods and systems of the invention is in excess of 19,000 hrs, consistent with the longevity of other less sensitive elements of the system.

Many alternative patterns to the scans shown in FIGS. 6 and 7 can also be implemented, depending on the specifics of the materials used for the optical element under considerations and the operational parameters of the system. An example of such an alternative pattern includes shifting the whole pattern diagonally by half the micro-step size after one round trip. This may make the surface coverage smoother in terms of energy or power distribution over time. All such two-dimensional scan patterns fall within the scope of the system and methods of the present invention.

Figure 8:
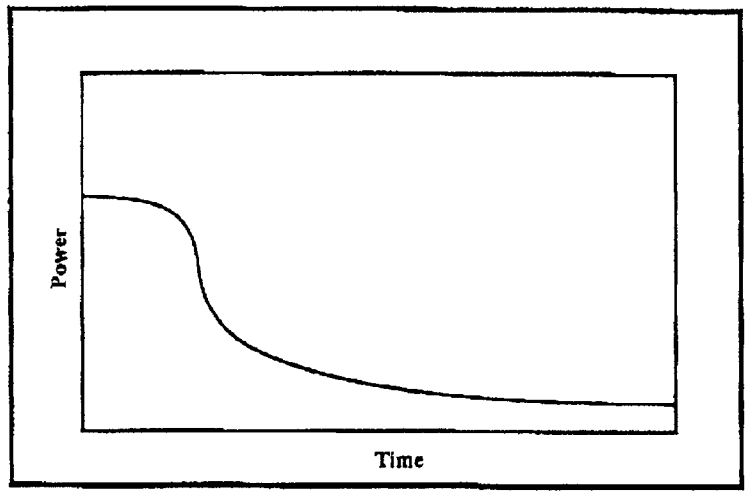
FIG. 8 is a schematic indicating (a) the drop in power over time without micro-scanning, (b) constant power with fast micro-scanning showing power fluctuations, and (c) constant power as a function of time indicating enhanced lifetime using a slow micro-scanning algorithm
Figure 8:
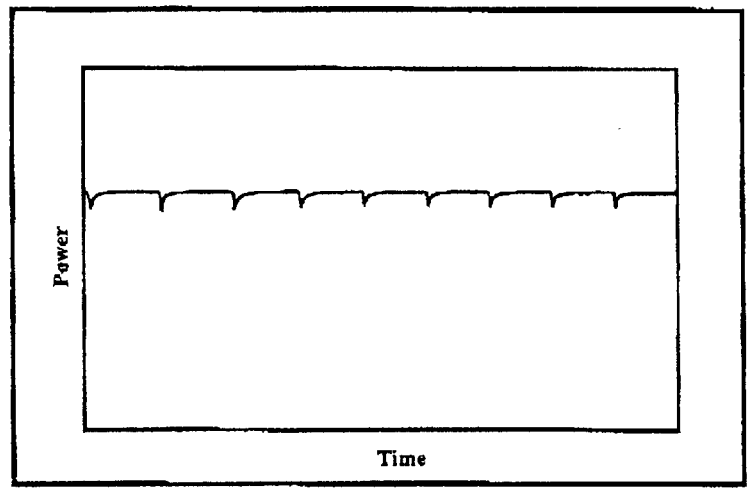
Figure 8:
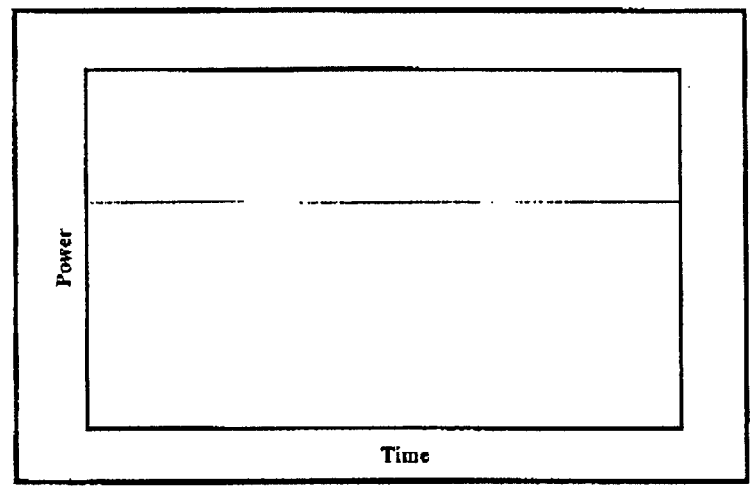

Another important consideration that must be accounted for in the algorithms disclosed in the invention is the relationship between the dwell-time and the transparency and smoothness of transitions between micro-spots. FIG. 8 shows the typical characteristics for a beam incident on a macro-spot. FIG. 8(a) indicates the type of power drop that may be expected when multiple pulses are incident on a single spot on the optical element. This may correspond to an actual measurement which leads to the selection of time interval dt (represented earlier by numeral 28 in FIG. 1), which corresponds to allowed dwell time just before the power drop. With micro-scanning, such power drop should not happen until much later, as was experimentally confirmed. However the change between successive micro-spots might induce (depending on the crystal quality) an instantaneous drop in power, as is indicated in FIG. 8(b), with power recovering within a certain time constant (ranging from seconds to minutes), characteristic of the material, coating and laser parameters. This is may generally correspond to a thermal equilibration time of the irradiated crystal or substrate volume: and may be ascribed to residual absorption upon heating which may be annealed upon continuous exposure or stabilize once a desired operating point is reached. One way to avoid this drop in power, the move from micro-spot to micro-spot can be set to be at a sufficiently low velocity, yielding the desired constant power operation shown in FIG. 8(c).

Figure 9:
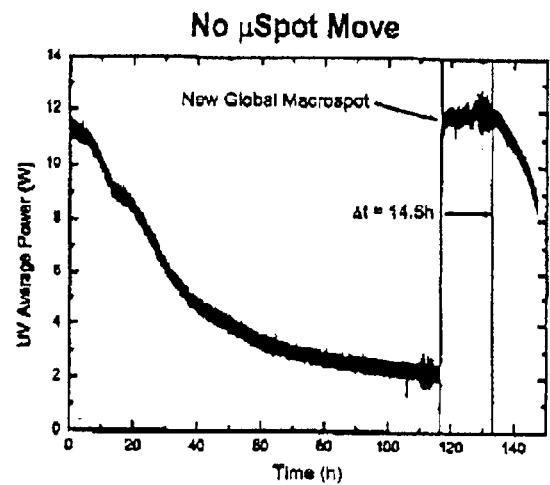
FIG. 9 shows measured data for an LBO crystal used to generate a high power 355 nm beams, indicating correspondence of observed features (a)–(c) with the characteristics of FIGS. 8(a)–(c)
Figure 9:
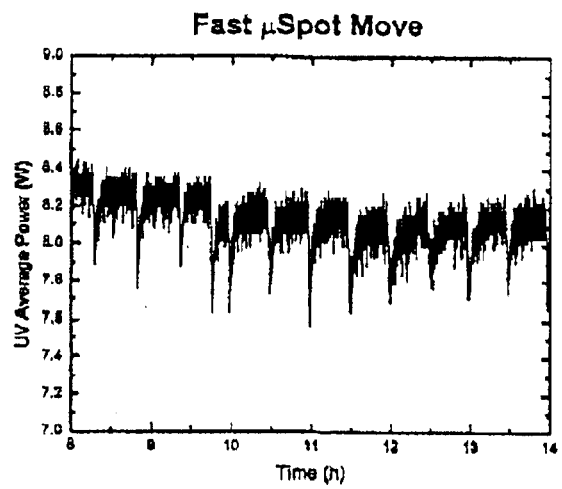
Figure 9:
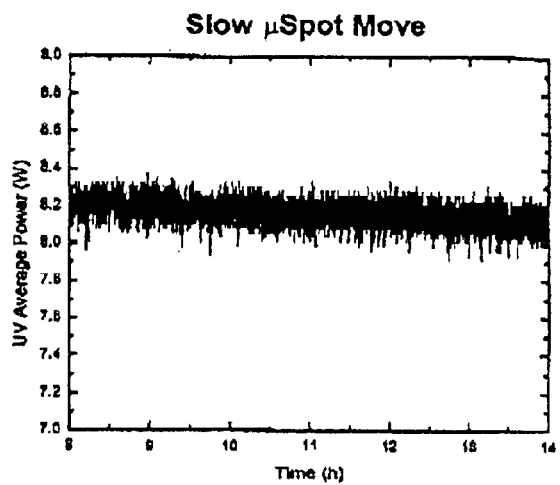

These characteristics were validated for the LBO crystal used in the earlier examples, as shown in FIGS. 9(a) through 9(c). In this case, the power fluctuations shown in FIG. 9(b) are attributed to the finite time required for a new micro-spot to access the correct phase-matching temperature, a process, which is not instantaneous. However, when the speed of translation between spots is decreased from about 25 nm/s to 600 nm/s, the power drops were demonstrated to be substantially reduced to be within the noise of the power measurement as indicated in FIG. 9(c). It is noted that to avoid a similar effect for beam translation between macro-spots, a translation velocity of about 6 mm/s was found to be slow enough to avoid undesirable power drops.

Many other improvements and modifications are feasible for this system. Thus, although the demonstration discussed so far involved discrete scanning steps, continual motion may be desirable, for example, in systems involving frequency conversion of CW or mode-locked beams. This could potentially result in a breakthrough for high power operation at UV wavelengths, a major advantage for laser systems known to be life limited. Algorithms may be modified and automated stages built for additional crystals and optics, opening the door to long life operation of a deep UV solid state laser based system, including harmonics at 213 nm and even below 200 nm. More complex algorithms can also be developed to allow scanning across different types of optical elements known to be at risk of damage from one or more intense laser beams. Selected scanning patterns may thus be continuous or discontinuous, and include a variety of random or structured geometries as may be necessary to accommodate different operational conditions for a given system. The algorithms also allow variable patterns to be stored within the software and can accommodate different time constants and/or spot sizes. For more complex or demanding systems, automatic recording of the number of "laser-on time" hrs spent on each macro- and micro-spot may be desired. In the case of non-linear crystals, automatic tuning procedures may be further implemented so as to continually optimize the crystal's temperatures to better compensate for small changes in phase match angle or temperature, based on input from power or energy monitors.

In one embodiment of the present invention, a method is provided for optimizing lifetime of an optical element that has a clear aperture when subject to irradiation by at least one laser beam. In this embodiment, the aperture is divided into a matrix of macro-spots that each have a known degradation time constant and a quality factor. A spatial pattern of micro-spots is selected within each macro-spot. The optical element is translated through the micro-spot pattern with respect to a first laser beam according to a pre-determined first temporal sequence. A lifetime per macro-spot is increased by at least a factor of 2.

A second temporal sequence can be employed for relative translation of the optical element with respect to the first laser beam. Successive macro-spots can be exposed to radiation, each for a sufficient duration to complete a first temporal sequence. The first temporal sequence can be completed for each macro-spot. The optical element can be translated through the micro-spot pattern with respect to a second laser beam and a third laser beam.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A method for optimizing lifetime of an optical element that has a clear aperture when subject to irradiation by at least one laser beam, comprising:
   dividing the aperture into a matrix of macro-spots that each have a known degradation time constant and a quality factor;
   selecting a spatial pattern of micro-spots within each macro-spot; and
   translating the optical element through the micro-spot pattern with respect to a first laser beam according to a pre-determined first temporal sequence and increase a lifetime per macro-spot by at least a factor of 2.

2. The method of claim 1, further comprising:
   employing a second temporal sequence for relative translation of the optical element with respect to the first laser beam; and
   exposing successive macro-spots to radiation each for a sufficient duration to complete a first temporal sequence.

3. The method of claim 2, wherein the first temporal sequence is completed for each macro-spot.

4. The method of claim 1, further comprising:
   translating the optical element through the micro-spot pattern with respect to a second laser beam.

5. The method of claim 4, wherein the first and second laser beams have different wavelengths.

6. The method of claim 4, further comprising:
   translating the optical element through the micro-Spot pattern with respect to a third laser beam.

7. The method of claim 6, wherein the first, second and third laser beams each have different wavelengths.

8. The method of claim 6, wherein at least of the first, second and third laser beams is in the UV spectral range.

9. The method of claim 1, wherein the optical element is a non-linear crystal.

10. The method of claim 1, wherein translation of the optical element with respect to the first laser beam is achieved while providing suitable conditions for phase matching.

11. The method of claim 10, wherein the optical element is positioned in an oven during translation of the optical element with respect to the first laser beam.

12. The method of claim 11, wherein the oven provides a suitable temperature for phase matching.

13. The method of claim 11, wherein the oven provides an optical temperature for phase matching.

14. The method of claim 1, wherein a lifetime per macro-spot of the optical element is increased by at least one order of magnitude.

15. The method of claim 1, wherein an overall lifetime of the optical element is increased by at least one order of magnitude.

16. The method of claim 1, wherein translation of the optical element with respect to the first laser beam is achieved by moving the optical element.

17. The method of claim 1, wherein translation of the optical element with respect to the first laser beam is achieved by scanning the first laser beam across the optical element.

18. The method of claim 1, further comprising:

using a feedback loop to access data received from at least one monitor that measures an unexpected drop in power of at least a portion of the micro-spots.

19. The method of claim 18, wherein the feedback loop provides smooth transitions between the micro-spots.

* * * * *